March 22, 1927.   C. G. FRELIN   1,621,979
ARTICULATED CAR
Filed Oct. 2, 1926   2 Sheets-Sheet 1

WITNESS
William Dinning

INVENTOR
Carl G. Frelin,
by G. P. Laube,
Attorney.

March 22, 1927.

C. G. FRELIN

ARTICULATED CAR

Filed Oct. 2, 1926

1,621,979

2 Sheets-Sheet 2

WITNESS
William Dinning.

INVENTOR
Carl G. Frelin.
by H. Lambe
Attorney.

Patented Mar. 22, 1927.

1,621,979

UNITED STATES PATENT OFFICE.

CARL G. FRELIN, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

ARTICULATED CAR.

Application filed October 2, 1926. Serial No. 139,095.

An object of the present invention is to provide a connection for the adjacent ends of two bodies of an articulated car, which connection comprises a plurality of members, one carried by each of said ends, such members being adapted to engage with each other to transmit buffing shocks from one of the car bodies to the other at all times and further to provide a sliding bearing for said ends for the purpose of permitting the bodies to move vertically and horizontally relative to each other.

Another object of the invention is to provide each of the adjacent ends of two car bodies of an articulated car with a buffing member, which members are adapted to engage with each other and are so mounted in said ends that their outer bearing faces will be in the same plane with each other regardless of the position of one of said car bodies relative to the other.

These and other objects will be apparent from the following description.

Figure 1:
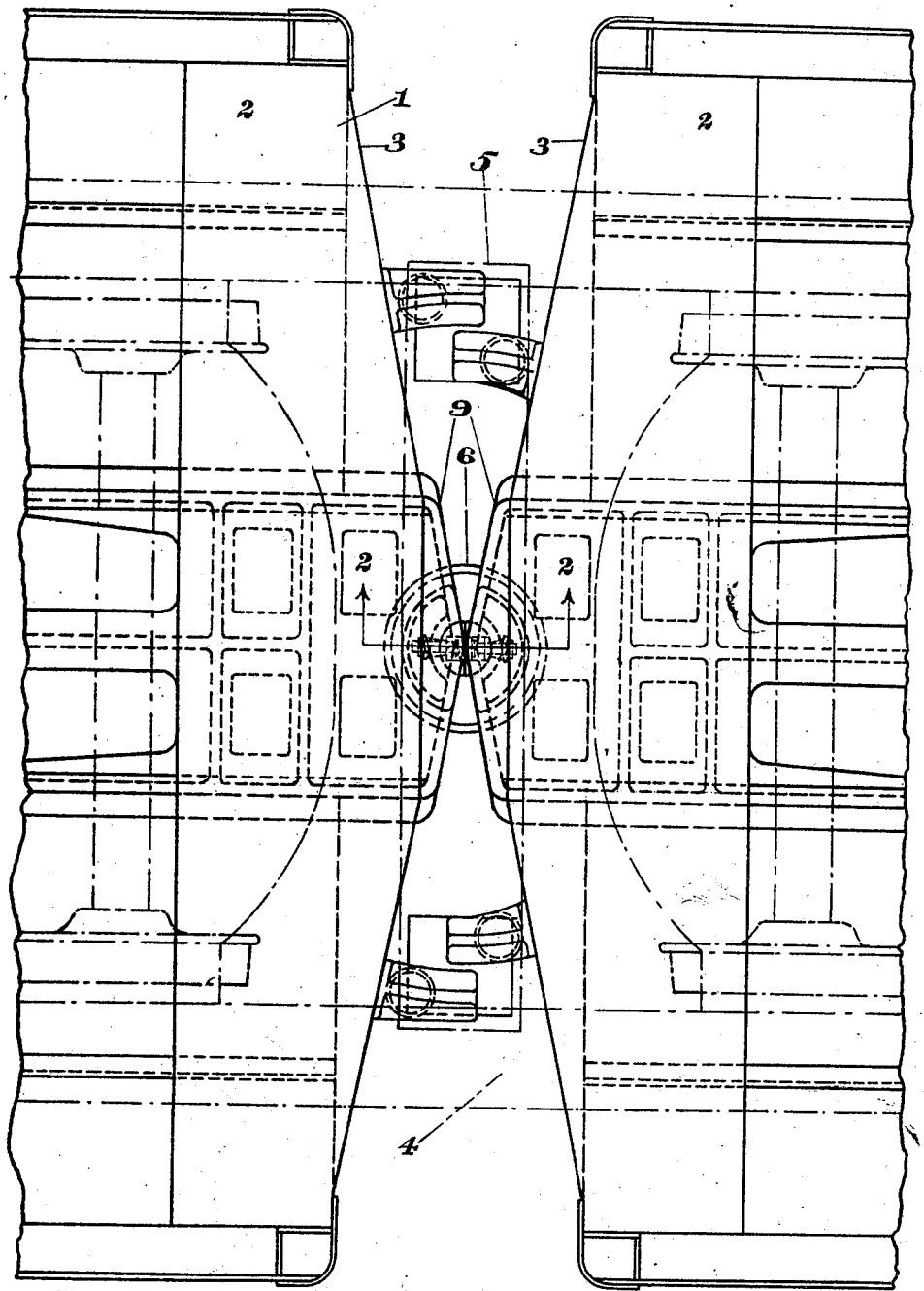
Figure 2:
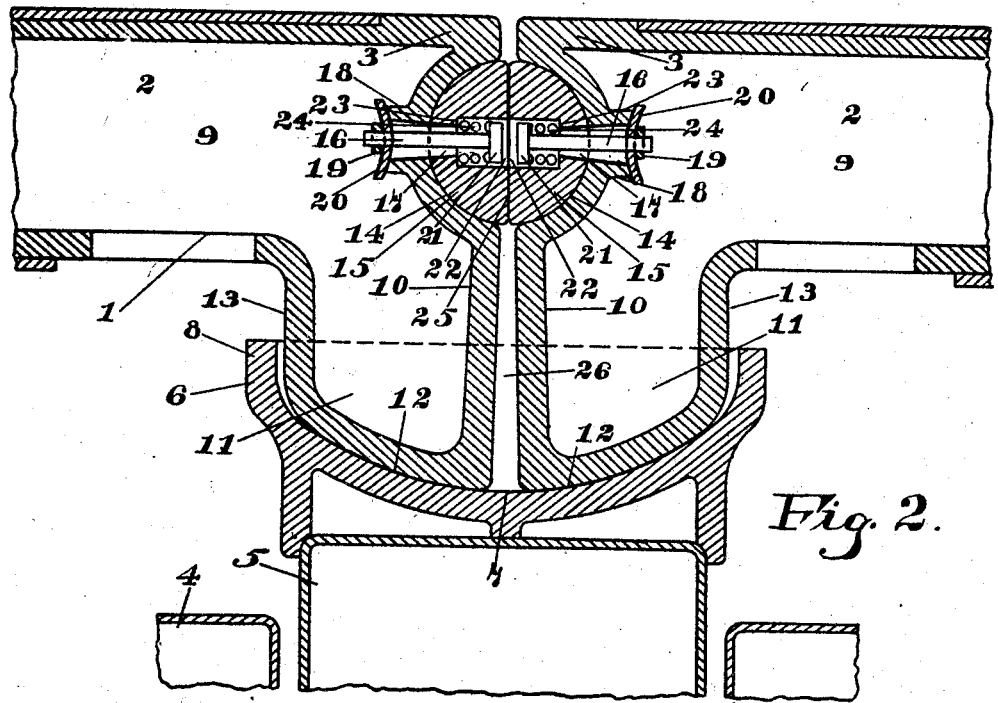
Figure 3:
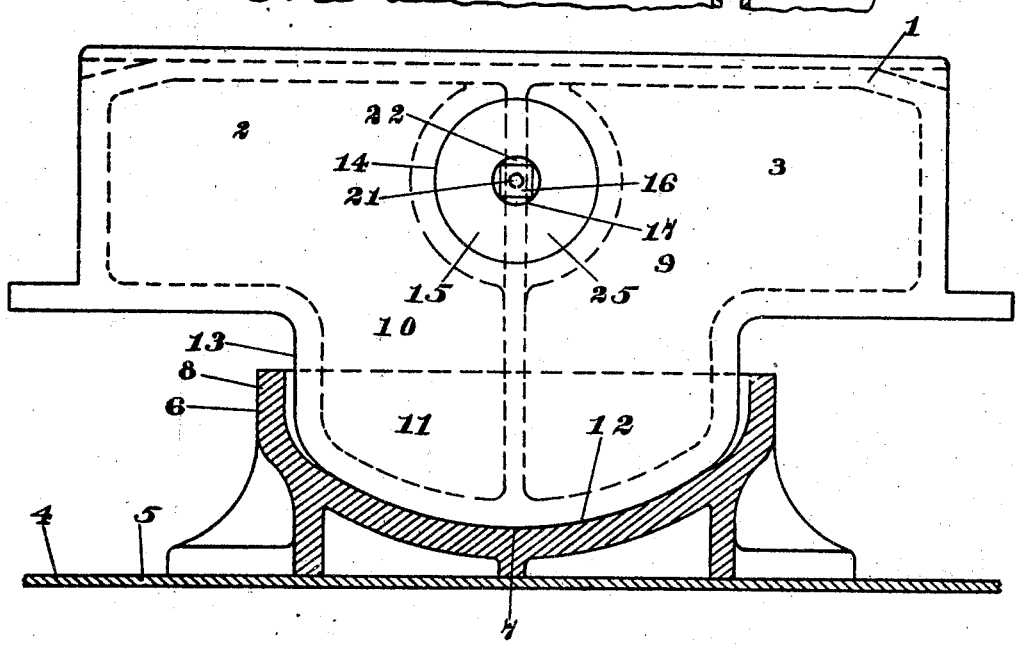

Referring to the drawings in which like reference characters refer to like parts, Fig. 1 is a plan view of a portion of the adjacent ends of two bodies of an articulated car embodying the invention; Fig. 2 is an enlarged sectional view of the same taken on the line 2—2 of Fig. 1, and Fig. 3 is an enlarged detail end elevational view of a portion of the end of one of the car bodies.

Referring now in detail to the drawings, the reference character 1 indicates an articulated car unit which comprises a plurality of car bodies 2. In the accompanying drawings the adjacent ends 3 of only two of such bodies have been illustrated but it will be understood that an articulated car unit may comprise two or any other desired number of bodies 2. When the car unit comprises two bodies, the adjacent ends 3 thereof are carried by a single truck 4 as shown in the drawings and each of the outer ends of such bodies (not shown) is carried by a truck, thus a car unit of two bodies is carried by three trucks. When the car unit comprises more than two bodies, the outer ends of the bodies at opposite ends of the car are each carried by a truck and the opposite end of each of these bodies and the adjacent end of an adjacent body are carried by a single truck, thus a car unit of three bodies will be carried by four trucks. The truck 4 may be of any suitable form or construction and is preferably provided with a truck bolster 5. Intermediate its ends this bolster is provided with a truck center plate 6 having a concave upper bearing surface 7 which, around its outer portion, terminates in an upwardly extending circular flange 8.

Each of the ends 3 of adjacent car bodies is provided with a member 9 which is suitably secured to the underframe of the car body and preferably forms a part thereof. Beyond the end of the car body this member is provided with an end wall 10 which extends on either side of the longitudinal center line at such an angle that when the adjacent ends of two of the bodies are suitably mounted on the truck the walls 10 of the members 9 will not interfere with each other as the bodies swivel in passing around a curve. The outer end portion of this member 9 has a downwardly depending portion 11, the lower surface 12 of which is in the form of a portion of a sphere and is adapted to engage a portion of the upper surface 7 of the center plate member 6 secured to the truck which surfaces 12 and 7 substantially conform in contour with each other. The flange 8 of the truck center plate is adapted to engage with a vertically disposed portion 13 of the portion 11 of the member 9 to prevent the accidental separation of the body and the truck. Above the surface 12, and preferably near the top of the member 9, the end wall 10 thereof is provided with a recess or socket 14 in which a semi-spherical member 15 is loosely mounted. This member is held in the socket 14 preferably by a bolt 16 which extends through openings 17 and 18 formed in the member 15 and portion of the member 9 respectively. At one end the bolt 16 is provided with a nut 19 which engages a curved washer 20, such washer, in turn, engaging a portion of the member 9. At its opposite end, this bolt is provided with a head 21 which, when the bolt is in its proper operative position, is within an enlarged portion 22 of the opening 17 in the member 15. Between the head 21 and a shoulder 23 formed in the member 15 within the openings 17, a spring 24 is interposed, one end of such spring seating on the underside of the head 21 and the other end seating on the shoulder 23. The openings 17 and 18 are of greater diameter than the bolt 16 and are of such a size as to permit the member 15 to swivel freely. The spring 24 is for the purpose of keeping tension on the bolt 16 at all times, thus preventing the bolt from chattering. This spring also has a tendency to centralize the member 15 when the car body is being mounted on a truck or when it is being removed from a truck. When the member 15 is mounted in the socket 14 it projects slightly beyond the end of the member 9 and has an outer flat surface 25, which surface is adapted to contact with the member 15 mounted in the same manner in the adjacent end of the adjacent car body.

When the adjacent ends of two adjacent bodies of a car are in their proper positions, relative to the truck and to each other, as shown in Figures 1 and 2 of the drawings, the surfaces 25 of the members 15 will be parallel at all times and will be in contact with each other, thus providing a large wearing surface beween the bodies which will permit free movement of the member 15 in the plane of the surfaces 25. The surfaces 12 and 7 of the members 9 and center bearing member 6 respectively are concentric with the outer surfaces of the members 15, so that when the adjacent ends of two car bodies are in their proper operative positions, as illustrated in the drawings, the members 15 will be almost entirely enclosed in the recesses 14, and the surfaces 12 and 7 will be in sliding engagement with each other, there being a space 26 of varying width provided between the end walls 10 to permit free swiveling movement of one body relative to the other. It will here be noted that the connection between the car bodies and the truck is such that free swiveling movement of the bodies relative to each other is permitted, as well as a free sliding movement in the plane of the bearing surfaces 25 of the members 15.

It will be further noted that as the members 15 project slightly beyond the ends of the members 9 they will maintain the adjacent bodies in spaced relation to each other when the bodies receive a buffing shock.

It will also be noted that should the members 15 become damaged, they can be easily removed and replaced.

It will be apparent to those skilled in the art to which this invention appertains that changes may be made in the details of the several parts of the invention without departing from the spirit and scope of the appended claims.

Having thus described the invention what I claim as new and desire to secure by Letters Patent is:—

1. In an articulated car comprising a plurality of adjacent car bodies, and buffing means between said bodies, said means comprising a pair of members having contacting bearing surfaces parallel to each other in all directions.

2. In an articulated car comprising a plurality of car bodies, and buffing means for the adjacent ends of two of said bodies, said means comprising members embedded in said ends and having flat bearing faces adapted to engage each other.

3. In an articulated car comprising a plurality of car bodies, and buffing means for the adjacent ends of two of said bodies, said means comprising semi-spherical members mounted in said ends adapted to slidably engage each other.

4. In an articulated car comprising a plurality of adjacent car bodies, and means for transmitting buffing shocks from one of the ends of one of said bodies to the adjacent end of an adjacent body, said means comprising a plurality of semi-spherical members mounted in said ends and adapted to engage each other.

5. In an articulated car comprising a plurality of car bodies, a semi-spherical member mounted in the end of one of said bodies, a semi-spherical member mounted in the adjacent end of an adjacent body, said members having bearing faces adapted to contact with each other.

6. In an articulated car comprising a plurality of car bodies, and buffing members loosely mounted in the adjacent ends of two of said bodies adapted to engage each other, said members being adapted to permit relative transverse and vertical movement between said ends.

7. In an articulated car comprising a plurality of car bodies, buffing members mounted in the adjacent ends of two of said bodies transmitting buffing shocks from one of said bodies to the other, said members having flat surfaces adapted to engage with each other and having semi-spherical surfaces adapted to engage with said ends.

8. In an articulated car comprising a plurality of car bodies, a truck for supporting the adjacent ends of two of said bodies, a center bearing member on said truck, a center bearing on each of said bodies adapted to engage with said truck center bearing member, and buffing means mounted in said ends above said truck center bearing member, said means comprising a plurality of semi-spherical members each mounted in one of said ends.

9. In an articulated car comprising a plurality of car bodies, a truck for supporting the adjacent ends of two of said bodies, a truck center bearing member mounted on said truck, a body center bearing member on each of said ends adapted to seat in said truck center bearing member, said body and truck center bearing members having curved bearing surfaces, and buffing members mounted in said ends, each of said members having a bearing surface concentric with the bearing surfaces of said truck and body center bearing members.

10. In an articulated car comprising a plurality of car bodies, buffing means between the adjacent ends of two of said bodies, said means comprising a member mounted on each of said ends, means for securing said members to their respective car bodies, and springs interposed between said means and members.

11. In an articulated car comprising a plurality of car bodies, buffing means for the adjacent ends of two of said bodies, said means comprising a pair of interengaging members each mounted in one of said bodies, a bolt for securing each of said members to its respective car body, and resilient means interposed between said bolt and member.

12. In a car body for an articulated car, a buffing member mounted in said body, a member for securing said buffing member to said body, and resilient means interposed between said bearing member and buffing member.

13. In a car body for an articulated car, a buffing member mounted in said body and adapted to swivel relative thereto, a member for securing said buffing member to said body, and resilient means engaging said members.

14. In a car body for an articulated car, a buffing member mounted in said body, and means for securing said member to said body, said means permitting a swiveling movement in any direction, between said body and member.

15. In a car body for an articulated car, and a semi-spherical buffing member mounted in said body, said member having buffing surface beyond the end of said body.

16. In a car body for an articulated car, said body having a curved recess formed therein, a semi-spherical member mounted in said recess, and means for adjustably securing said member in said recess.

17. In a car body for an articulated car, said body having a recess formed therein, a semi-spherical member movably mounted in said recess and extending beyond the end of said body, and means for holding said member to said body.

18. In an articulated car comprising a plurality of car bodies, the adjacent ends of said bodies being spaced apart, and semi-spherical members mounted in the adjacent ends of adjacent bodies for maintaining said bodies in their spaced relation and for transmitting buffing shocks from one of said bodies to the other.

In testimony whereof I affix my signature.

CARL G. FRELIN.